UNITED STATES PATENT OFFICE.

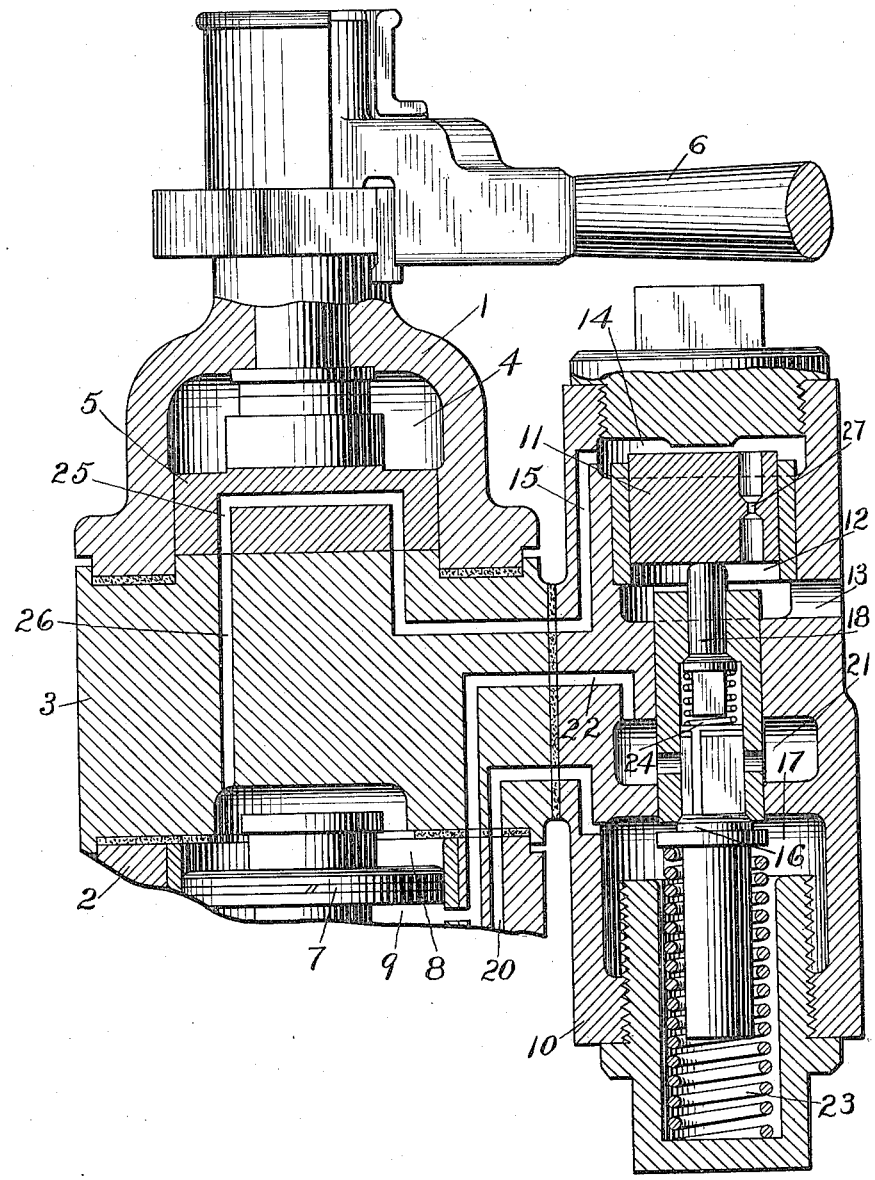

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE DEVICE.

1,153,275.   Specification of Letters Patent.   Patented Sept. 14, 1915.

Application filed November 2, 1914. Serial No. 869,803.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brake Devices, of which the following is a specification.

This invention relates to fluid pressure brakes, and more particularly to a brake valve device.

In the operation of traction cars where the motorman changes ends preparatory to making a return run, instructions are usually given to apply the brakes with sufficient force to hold the car or train before leaving the end of the car. These instructions are sometimes disregarded, with the result that runaways occur, especially where the train happens to be on a grade.

The principal object of my invention is to provide means for insuring an application of the brakes when the motorman removes the brake valve handle preparatory to changing ends or for other purpose.

In the accompanying drawing, a central vertical section of a brake valve device is illustrated, showing my invention applied thereto.

The brake valve device shown in the drawing is of the usual automatic type comprising a rotary valve casing 1, an equalizing discharge valve casing 2, and an intermediate section 3.

The rotary valve casing 1 has the usual valve chamber 4 containing rotary valve 5 adapted to be operated by brake valve handle 6 and the equalizing discharge valve casing 2 has a piston chamber containing the usual equalizing discharge valve piston 7, the chamber 8 on one side being open to the equalizing reservoir and the chamber 9 below the piston being open to the brake pipe when the usual brake pipe cut out cock is open.

According to my present invention, an auxiliary valve device is provided for automatically effecting the operation of the usual equalizing discharge valve mechanism when the brake valve handle is turned to handle off position. The auxiliary valve device may comprise a casing 10 adapted to be secured to the brake valve section 3 and having a piston chamber containing a piston 11, the chamber 12 at one side of which is open to an atmospheric exhaust port 13 and the chamber 14 at the opposite side to a passage 15 leading to the seat of the rotary valve 5. The piston 11 is adapted to operate a vent valve 16 contained in valve chamber 17, through the medium of a check valve 18, and the valve 16 controls communication from chamber 17, which is constantly open to the brake pipe through passage 20, to chamber 21 having a passage 22 leading to the chamber 9 below the equalizing piston 7.

While not shown on the drawing, it will be understood that passage 20 is connected to an extra pipe which opens into the brake pipe below the usual cut-out cock, so that the brake pipe is always open to passage 20, regardless of the position of the cut-out cock.

The vent valve 16 is subject to the pressure of a spring 23 tending to seat the valve and the check valve 18 is acted upon by a spring 24.

In operation, when the motorman desires to change ends, he first closes the usual cut out cock in the brake pipe and then turns the brake valve handle 6 to handle off position. In this position, as shown in the drawing, a cavity 25 in the rotary valve 5 connects passage 15 with a passage 26 leading to the chamber 8 and the equalizing reservoir. Fluid under pressure is thus supplied to one side of the piston 11 which is then operated so as to shift the check valve 18 and thereby push the vent valve 16 off its seat. Communication is now opened, so that fluid from the brake pipe can flow through passage 20, past valve 16 to chamber 21 and thence through passage 22 to the under side of the equalizing piston 7. The piston 11 has a small port 27, through which fluid from the equalizing reservoir can escape to the exhaust port 13, and upon a reduction in pressure in the equalizing reservoir by flow to the exhaust port 13, the higher brake pipe pressure present in chamber 9 below the equalizing piston 7 operates the same, and in the usual manner, the equalizing discharge valve device is actuated to vent fluid from the brake pipe and thereby cause an application of the brakes. When the brake pipe pressure has been reduced to a predetermined degree, dependent upon the area of the piston 11 and the resistance of the spring 23, the vent valve 16 will close, thus cutting off communication from the brake pipe to the underside of the equalizing piston, so that while the pressure in the equalizing reservoir continues to reduce through the port 27, further reduction in brake pipe pressure will cease, since the brake pipe connection to the equalizing discharge valve is cut off.

Having now described my invention, what I claim as new and desire to secure by Letters Patent, is:

1. In a brake valve device, the combination with a brake valve handle, of means for automatically effecting an application of the brakes upon movement of the brake valve handle to handle off position.

2. In a brake valve device, the combination with a brake valve handle, of means for effecting a reduction in brake pipe pressure upon movement of the brake valve handle to a position for removing the handle.

3. In a brake valve device, the combination with a brake valve handle, of means for effecting a predetermined reduction in brake pipe pressure and thereby an application of the brakes upon movement of the brake valve handle to handle off position.

4. The combination with a brake valve device having an equalizing discharge valve mechanism normally subject to the opposing pressures of an equalizing reservoir and brake pipe, of a valve mechanism operated in the handle off position of the brake valve for opening communication from the brake pipe to the brake pipe side of the equalizing discharge valve mechanism.

5. The combination with a brake valve device having an equalizing discharge valve mechanism including the usual equalizing piston normally subject to the opposing pressures of the equalizing reservoir and the brake pipe, of a valve for controlling communication from the brake pipe to the brake pipe side of the equalizing piston, and a piston operated by fluid from the equalizing reservoir when the brake valve handle is in handle off position for actuating said valve.

6. The combination with a brake valve device having an equalizing discharge valve mechanism including the usual equalizing piston normally subject to the opposing pressures of the equalizing reservoir and the brake pipe, of a valve for controlling communication from the brake pipe to the brake pipe side of the equalizing piston, a piston operated by fluid from the equalizing reservoir supplied with the brake valve device in handle off position for opening said valve, and means for closing said valve upon a predetermined reduction in equalizing reservoir pressure.

7. The combination with a brake valve device having an equalizing discharge valve mechanism including the usual equalizing piston, subject to the opposing pressures of the brake pipe and the equalizing reservoir, of means for venting fluid from the equalizing reservoir in handle off position of the brake valve device and means for opening communication from the brake pipe to the brake pipe side of the equalizing piston upon movement of the brake valve handle to handle off position.

8. The combination with a brake valve device having an equalizing discharge valve mechanism including the usual equalizing piston, subject to the opposing pressures of the brake pipe and the equalizing reservoir, of means operated upon movement of the brake valve handle to handle off position for effecting the operation of the equalizing discharge valve mechanism.

9. The combination with a brake valve device having an equalizing discharge valve mechanism including the usual equalizing piston, subject to the opposing pressures of the brake pipe and the equalizing reservoir, of means operated upon movement of the brake valve handle to handle off position for causing the automatic operation of the equalizing discharge valve mechanism to effect a predetermined reduction in brake pipe pressure.

In testimony whereof I have hereunto set my hand.

WALTER V. TURNER.

Witnesses:
A. M. CLEMENTS,
BARBARA HERBERT.

Copies of this patent may be obtained for five cents each, by addressing the "Commissioner of Patents, Washington, D. C."